United States Patent
Sorkin

(10) Patent No.: US 6,380,508 B1
(45) Date of Patent: Apr. 30, 2002

(54) APPARATUS AND METHOD FOR SEVERING A TENDON USED IN POST-TENSION CONSTRUCTION

(76) Inventor: Felix L. Sorkin, 4115 Greenbriar Dr., P.O. Box 1503, Stafford, TX (US) 77477

( * ) Notice: Subject to any disclaimer, the term of this patent is extended or adjusted under 35 U.S.C. 154(b) by 0 days.

(21) Appl. No.: 09/614,240

(22) Filed: Jul. 12, 2000

(51) Int. Cl.[7] .............................................. B23K 10/00
(52) U.S. Cl. .............................. 219/121.39; 219/121.44
(58) Field of Search .......................... 219/121.5, 121.39, 219/121.67, 121.59, 121.58, 121.48, 121.36; 52/233, 233.13; 228/25

(56) References Cited

U.S. PATENT DOCUMENTS

| | | |
|---|---|---|
| 4,896,470 A | 1/1990 | Sorkin |
| 5,072,558 A | 12/1991 | Sorkin et al. |
| 5,271,199 A * | 12/1993 | Northern .................. 52/223.13 |
| 5,436,425 A | 7/1995 | Sorkin |
| 5,897,102 A * | 4/1999 | Sorkin ....................... 254/29 A |
| 6,040,546 A | 3/2000 | Sorkin |

* cited by examiner

Primary Examiner—Teresa Walberg
Assistant Examiner—Quang Van
(74) Attorney, Agent, or Firm—Harrison & Egbert

(57) ABSTRACT

A post-tension construction apparatus including a concrete slab, an anchor embedded in the concrete slab, a tendon fixedly received by and extending through the anchor so as to have a portion extending outwardly of one end of the anchor, and a pocket formed in the concrete slab and extending outwardly from one end of the anchor. The pocket has a wall extending outwardly from one end of the anchor. The wall has a pivot point formed thereon. A cutting torch is removably received within the pocket. The cutting torch has a pivot formed thereon which is pivotally engagable with the pivot point of the pocket.

14 Claims, 5 Drawing Sheets

APPARATUS AND METHOD FOR SEVERING A TENDON USED IN POST-TENSION CONSTRUCTION

TECHNICAL FIELD

The present invention relates to an apparatus and method for cutting tendons, especially post-tension tendons used in concrete structures, by using an acetylene torch or a plasma cutting torch.

BACKGROUND ART

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is extremely weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel tendon, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly in such post-tensioning operations, there are provided anchors for anchoring the ends of the tendons suspended therebetween. In the course of installing the tendon tensioning anchor assembly in a concrete structure, a hydraulic jack or the like is releasably attached to one of the exposed ends of the tendon for applying a predetermined amount of tension to the tendon. When the desired amount of tension is applied to the tendon, wedges, threaded nuts, or the like, are used to capture the tendon and, as the jack is removed from the tendon, to prevent its relaxation and hold it in its stressed condition.

Metallic components within concrete structures may become exposed to many corrosive elements, such as de-icing chemicals, sea water, brackish water, or spray from these sources, as well as salt water. If this occurs, and the exposed portions of the tendon or anchor suffer corrosion, then they may become weakened due to this corrosion. The deterioration of the anchor or tendon can cause the tendons to slip, thereby losing the compressive effects on the structure, or the anchor can fracture. In addition, the large volume of by-products from the corrosive reaction is often sufficient to fracture the surrounding structure. These elements and problems can be sufficient so as to cause a premature failure of the post-tensioning system and a deterioration of the structure.

Several U.S. patents have considered the problem of anchor and tendon corrosion. For example, U.S. Pat. Nos. 4,896,470 and 5,072,558 disclose tendon tensioning anchor systems in which the metal anchor for the system is encapsulated in plastic and has a tubular portion extending outwardly towards the surface of the post-tensioned concrete body. A sealing cap is fitted to the end of the tubular portion of the plastic encapsulation to provide a fluid tight seal for protecting the post-tensioned tendon, anchor and tensioning wedges from exposure to the elements. Other prior art systems also exist in which the end of the post-tensioned tendon is severed at a point inwardly from the outer surface of the post-tensioned concrete body and means are used to protect the tendon end, anchor and tensioning wedges from exposure to the elements.

When using prior art systems for corrosion protection of the tensioning tendon and related apparatus, it is important that the tendon be terminated at a point inboard from the outside surface of the post-tensioned concrete body. This requires that the end of the tendon be cut just outboard of the tensioning wedges and within the pocket or cavity formed by the pocketformer. The most common method used in the prior art for the cutting of such tensioned tendon at this point is an acetylene torch or cutting torch. Normally, the end of the cutting torch is placed in close proximity to the face of the anchor and within the pocket. Heat is applied directly to the tendon so as to sever the tension from that portion received within the anchor. Unfortunately, the cutting of the tension with a torch at the point near the tensioning wedges can cause the tendon and wedges to become heated and can result in the loss of temper of the metal or loosening of the post-tension wedges. Alternatively, the torch is not brought into close enough proximity to the anchor such that an improper cutting of the tension occurs. In other words, the tension may be cut so that an end of the tendon extends outwardly of the pocket and outwardly of the concrete body. No techniques have been used in the past for placing such a torch in close proximity to the anchor body within the pocket without causing the torch to adversely affect the post-tensioning wedges or the integrity of the anchor.

Another technique used for the cutting of the tendon is a conventional electric saw. However, this requires that a portion of the slab or other concrete structure surrounding the anchor also be cut in order to reach the portion of the tendon which is within the pocket formed in the concrete adjacent to the anchor.

Importantly, U.S. Pat. No. 5,436,425, issued on Jul. 25, 1995 to the present inventor described a system whereby the tendon could be properly cut by using a plasma cutting torch. This method and apparatus utilized a positioning element for interconnecting the head of a plasma cutting torch with the tendon to be severed. A positioning element conforms in shape to the pocket in the concrete body adjacent to the anchor. As such, the positioning element can be placed over the tendon and pushed into the pocket prior to activating the plasma cutting torch for the purposes of severing the tendon. The plasma cutting torch utilizes an air compressor, an electrical power source and electrodes to generate a stream of air, nitrogen or other gaseous plasma at very high temperatures of about 3000° C.–5000° C. or more. The stream of superheated gaseous plasma cuts through the metal more quickly than in an acetylene torch. The positioning element included a combination clamp and shield member which is releasably engagable with the tendon. The clamp included an attachment means or bracket which is engagable with the cutting head of the plasma torch. The attachment bracket is appropriately sized so as to be friction fitted around the cutting head or could be permanently attached to the cutting head. The positioning element is attached to a bracket and is releasably engagable with the tendon to be cut for positioning the cutting tip a predetermined distance from the longitudinal axis of the tendon. The positioning element includes a pair of depending jaws pivotally attached to a mounting bracket and biased towards a closed position by a spring. Each of the jaws has a semi-circular relieved portion at its inner edge which, when together, provides a circular opening through which the tendon may be received. Once the tendon is received in the center opening, the jaws close upon it.

Unfortunately, in this prior art patented device, it was found that typical construction environments do not utilize plasma cutting torches. These plasma cutting torches are very expensive and are typically not operated in a proper manner by the construction workers. As such, strong resistance to the use of such a plasma cutting torch has occurred. Conventionally, construction workers continue to utilize acetylene torches for the severing of the tendon.

Another problem associated with the use of torches for the cutting of tendons associated with plastic-encapsulated anchors used in a post-tension anchor system is that the cutting torch can impart heat to the tendon to such a sufficient degree as to cause a melting of the encapsulation. Since it is important to maintain the post-tension anchor system in an encapsulated condition, all of the plastic components of such an encapsulated system must be properly maintained. If, for example, the cap-receiving portion of the encapsulated anchor should become deformed or melted by heat, it would be impossible to attach the necessary cap or sealing devices so as to assure that the post-tension system is properly sealed. As such, it is important to be able to avoid the melting of the plastic encapsulations.

In an effort to overcome problems associated with U.S. Pat. No. 5,436,425, the present inventor made an improvement in the cutting torch, as shown by U.S. Pat. No. 6,040,546, issued on Mar. 21, 2000. In this device, the cutting torch apparatus included a first shield having an opening formed therein and adapted to allow the tendon to pass therethrough, a tubular extension extending outwardly of the first shield at the opening, and a bracket member affixed to the first shield and adapted to attach to the cutting torch such that the cutting torch resides on a side of the first shield. A second shield is connected to the bracket member. The second shield has an opening adapted to allow the tendon to extend therethrough. The second shield is arranged in spaced parallel relationship to the first shield. The cutting torch has a nozzle which is interposed between the first shield and the second shield. This device was particularly effective in avoiding the igniting of grease associated with the encapsulated tendon. It further resisted the migration of any flame across the tendon toward the plastic encapsulation. The device also effectively prevented sparks from flying from the pocket.

Unfortunately, with both U.S. Pat. Nos. 5,436,425 and 6,040,546, the shields created a problem in the actual work place environment. After repeated use, the shields would become damaged or deteriorate. The deformation of such shields would prevent the device from operating effectively during the cutting of the tendon. The use of such shielding techniques was often complicated by the fact that the workmen at the construction site would not fully comprehend the proper use of such shielding mechanisms. As such, a need developed so as to simplify the technique of properly spacing the cutting torch from the encapsulation of the anchor and from the wedges of the anchor.

In certain other circumstances, the size of the pockets used with these prior art patents was too large for certain construction purposes. As such, a need developed so as to minimize the size of the pocket required for the effective cutting of the tendon. In all circumstances, the manner of creating a proper tendon-cutting method would require that the method be very simple, easy to use and easy to implement.

It is an object of the present invention to provide a method and apparatus for severing the free end of a post-tension tendon at a point near the tensioning wedges and within the depth of the pocket formed for the anchor member.

It is another object of the present invention to provide such a method and apparatus in which the tendon is cut without substantially heating the tendon and tensioning wedges.

It is still a further object of the present invention to provide a method and apparatus in which the tendon can be cut at the desired location without damaging the post-tensioned concrete body.

It is a further object of the present invention to provide a method and apparatus in which the tendon can be cut by using a conventional acetylene torch.

It is a further object of the present invention to provide such a method and apparatus which is easy to use, relatively inexpensive, easy to implement and simple to manufacture.

These and other objects and advantages of the present invention will become apparent from a reading of the attached specification and appended claims.

SUMMARY OF THE INVENTION

The present invention is a cutting torch for use in severing tendons used in post-tension construction. This cutting torch comprises a handle, a head connected to the handle and a nozzle connected to an end of the head. The head of the cutting torch has a pivot formed thereon. The pivot is adapted for engagement with a corresponding pivot point formed within the pocket of the concrete slab.

The cutting torch has the head and the nozzle extending transverse to a longitudinal axis of the handle. The pivot is aligned with the longitudinal axis of the handle. In one embodiment of the present invention, the pivot comprises a protrusion extending outwardly of an exterior surface of the head. This protrusion is adapted to pivotally engage an indentation formed in the concrete slab. Alternatively, the pivot can comprise an indentation extending inwardly of an exterior surface of the head. The indentation is adapted to pivotally engage a protrusion formed in the concrete slab.

The present invention is also a post-tension construction apparatus comprising a concrete slab, an anchor embedded in the concrete slab, a tendon fixedly received by and extending through the anchor and a pocket formed in the concrete slab and extending outwardly from one end of the anchor. The tendon has a portion extending through the pocket. The pocket has a wall extending outwardly from the end of the anchor. This wall has a pivot point formed thereon.

In this post-tension construction apparatus, a cutting torch is removably received within the pocket. The cutting torch has a pivot formed thereon. This pivot is pivotally engagable with the pivot point of the pocket. The cutting torch has a cutting nozzle positioned adjacent to the tendon when the pivot engages the pivot point. The pocket has a space around the tendon suitable for allowing the cutting nozzle to pivot angularly therein such that the cutting nozzle directs a flame across a diameter of the tendon in the pocket. The pivot point can either be a protrusion or an indentation. The pivot can either be a protrusion or an indentation matingly engageable with the shape and size of the pivot point.

The present invention is also a method of cutting a tendon extending outwardly from an end of an anchor embedded in a concrete slab comprising the steps of: (1) forming a pocket in the concrete slab adjacent to an end of the anchor; (2) forming a pivot point in a wall of the pocket extending outwardly from the end of the anchor; (3) forming a pivot on a head of a cutting torch so as to have a size and shape matable with the pivot point, (4) inserting the cutting torch into the pocket such that the pivot engages with the pivot point; (5) directing a cutting nozzle of the cutting torch toward the tendon; and (6) pivoting the cutting nozzle within the pocket such that the tendon is severed by cutting energy from the cutting nozzle.

In this method, the cutting torch can be removed from the pocket when the tendon is severed. The step of forming the pivot point include either forming a protrusion or an indentation on the wall of the pocket. Similarly, the step of forming a pivot comprises forming an indentation or a protrusion on the head of the cutting torch. In the present method, the step of forming a pocket includes the steps of (1) securing the end of the anchor against one end of a pocketformer; (2) affixing an opposite end of the pocketformer against a form board; (3) solidifying concrete over and around the pocketformer and the anchor, and (4) removing the pocketformer from the end of the anchor after the concrete solidifies.

DETAILED DESCRIPTION OF THE INVENTION

Figure 1:
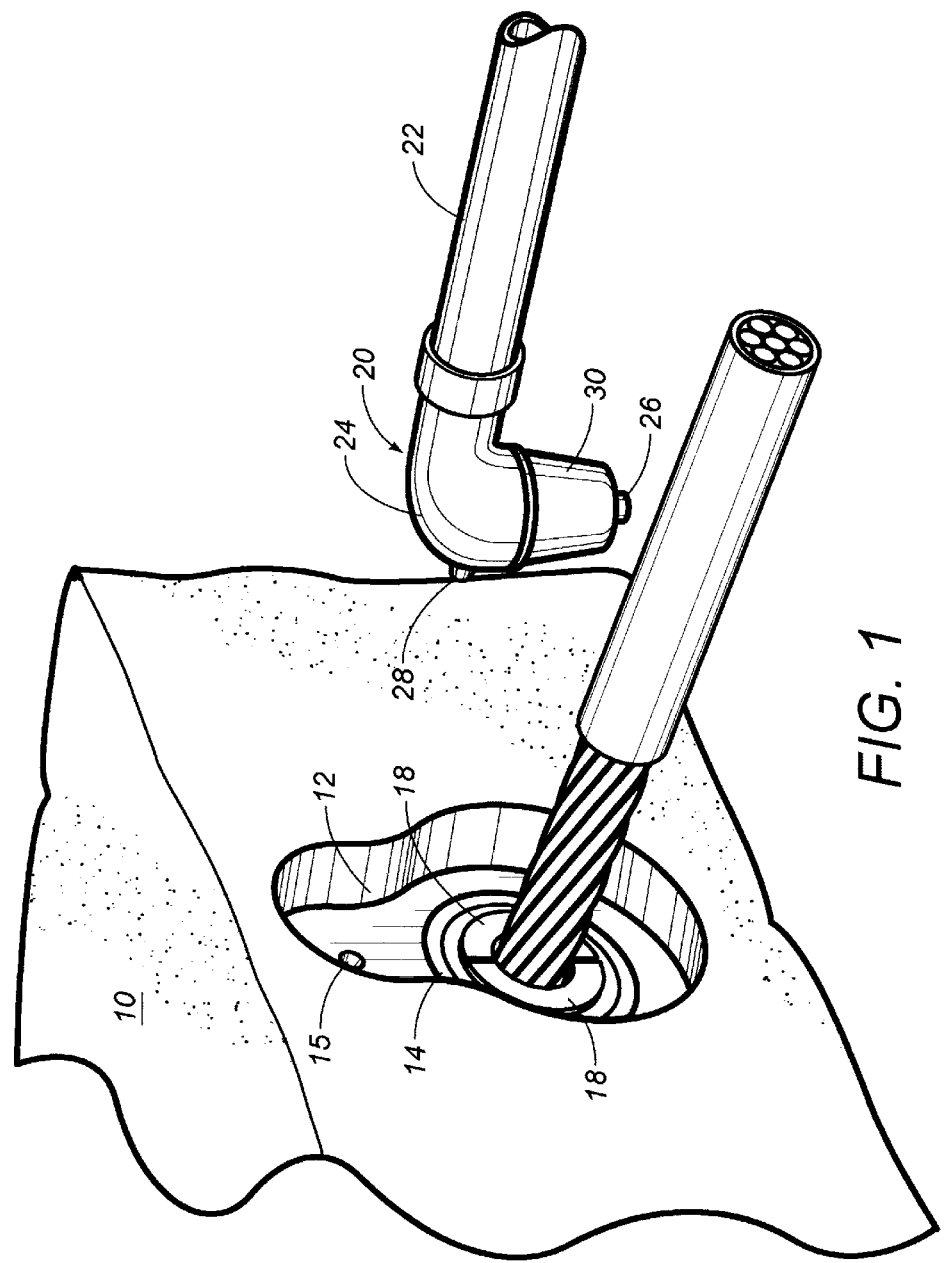
FIG. 1 is a perspective view showing the method and apparatus of the present invention.

Referring to FIG. 1, there is shown the concrete slab 10 which is used in conjunction with the present invention for the severing of a tendon 16 within a pocket 12 formed within the concrete slab 10. In particular, in the concrete slab 10, there is embedded an anchor 14 having gripping wedges 18 which serve to fixedly receive the tendon 16 therein. As such, a portion of the tendon 16 will be unsheathed and extend through the interior of the pocket 12. The pocket 12 has a wall 13 formed therein. A pivot point 15 is formed on the wall 13. In the preferred embodiment of the present invention, the pivot point 15 is spaced away from the tendon 16 and is located within an upper portion of the pocket 12. The pivot point 15 can either be a protrusion or an indentation. In FIG. 1, the pivot point 15 is shown as an indentation in the wall 13 of pocket 12.

In FIG. 1, it can be seen that there is a cutting torch 20 positioned away from the pocket 12 of the concrete slab 10. The cutting torch 20 includes a handle 22, ahead 24, a cutting nozzle 26 and a pivot 28. The pivot 28 is aligned with the longitudinal axis of the handle 22. The handle 22 can be used so as to deliver cutting gases, or other cutting energy, to the cutting nozzle 26. A ceramic heat shield 30 will surround the cutting nozzle 26. The cutting nozzle 26 is directed downwardly toward the tendon 16. The head 24 is connected to the handle 22 so as to have a portion extending downwardly toward the cutting nozzle 26. The pivot 28 is illustrated, in FIG. 1, as being a protrusion extending outwardly from the forward portion of the head 24. The protrusion 28 should have a suitable size and shape so as to be matingly received within the pivot point 15 formed on the wall 13 of pocket 12.

When the protrusion 28 is inserted into the pivot point 15, the cutting nozzle 26 will be in its desired position for the cutting of the tendon 16. The relationship of the protrusion 28 and the indentation associated with the pivot point is such that the cutting nozzle 26 will always be properly spaced a desired distance away from the gripping wedges 18 or from any polymeric encapsulation associated with the anchor 14. The cutting of the tendon 16 is achieved by using the handle 22 of the cutting torch 20 to pivot the cutting nozzle 26 within the pocket 12 so as to effectively cut the tendon 16.

As used within the concept of the present invention, the cutting torch 20 can be an acetylene torch, a plasma torch, or other torch having the capacity to cut through the tendon 16.

Figure 2:
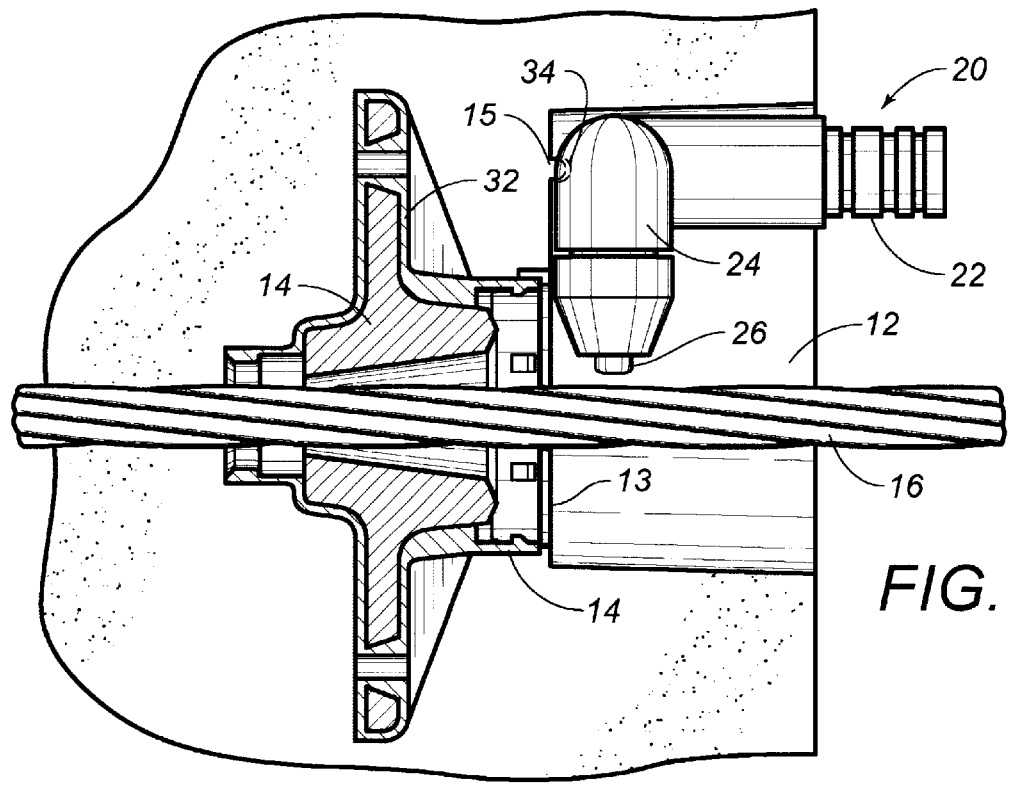
FIG. 2 is a cross-sectional view showing the one embodiment of the apparatus of the present invention.

In FIG. 2, it can be seen that the anchor 14 is embedded within the concrete slab 10. The anchor 14 has a polymeric encapsulation 32 extending therearound. The cutting torch 20 is illustrated as having its cutting head 24 positioned within the pocket 12. The handle 22 extends outwardly of the pocket 12. In FIG. 2, the pivot 28 is illustrated as an indentation 34 formed in the head 24 and aligned with the longitudinal axis of the handle 22. The pivot point 15 is illustrated as a protrusion extending outwardly of the wall 13 of pocket 12. In this form of the invention, the cutting head 24 can be positioned in the pocket by the mating relationship of the indentation 34 and the protrusion of pivot point 15. The cutting nozzle 26 is illustrated as directed toward an exterior surface of the tendon 16 within the pocket 12. It can be seen that the relationship between the pivot of the cutting head 24 and the pivot point 15 on the wall 13 of pocket 12 is such as to properly space the cutting nozzle 26 a desired distance from the polymeric encapsulation 32 associated with anchor 14. Similarly, the cutting nozzle 26 will be spaced a desired distance away from the location of the gripping wedges 18.

Figure 3:
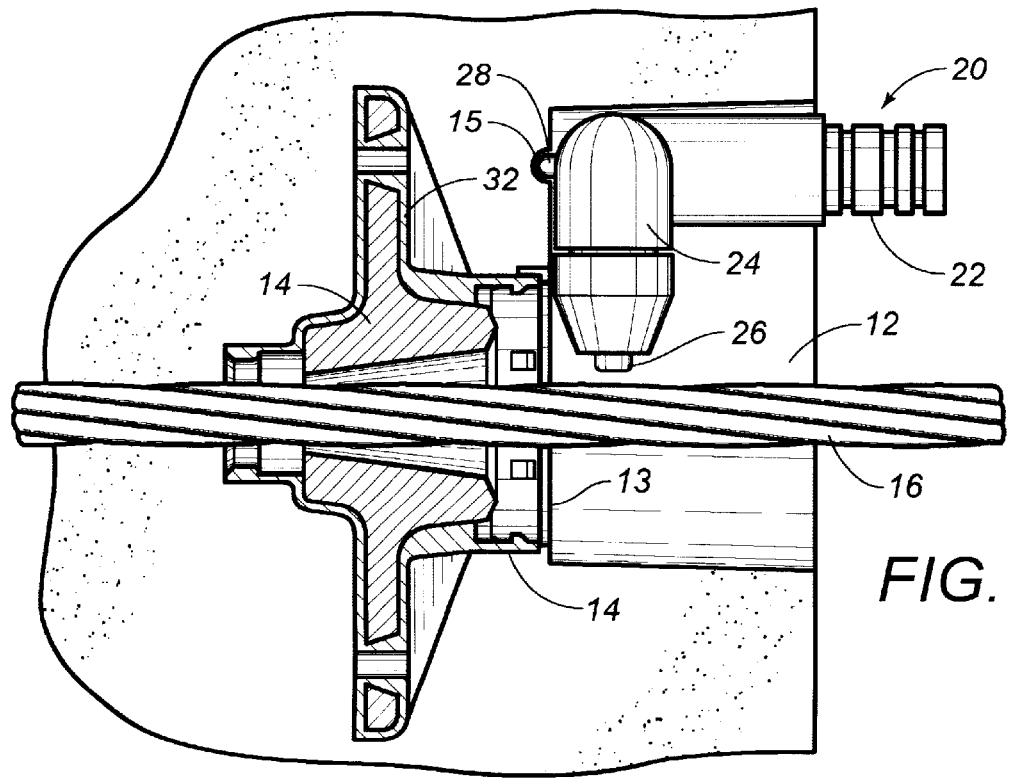
FIG. 3 is a cross-sectional view showing an alternative embodiment of the present invention.

FIG. 3 shows an embodiment similar to that of FIG. 2 but with the use of the protrusion 28 on the cutting head 24 of cutting torch 20 (such as referenced in FIG. 1). The protrusion 28 is received within the indentation of pivot point 15 formed on wall 13 of the pocket 12. Once again, this relationship between the protrusion 28 and the indentation of the pivot point 15 assures that the cutting nozzle 26 resides in a desired position relative to the tendon 16 and the surfaces of anchor 14.

Figure 4:
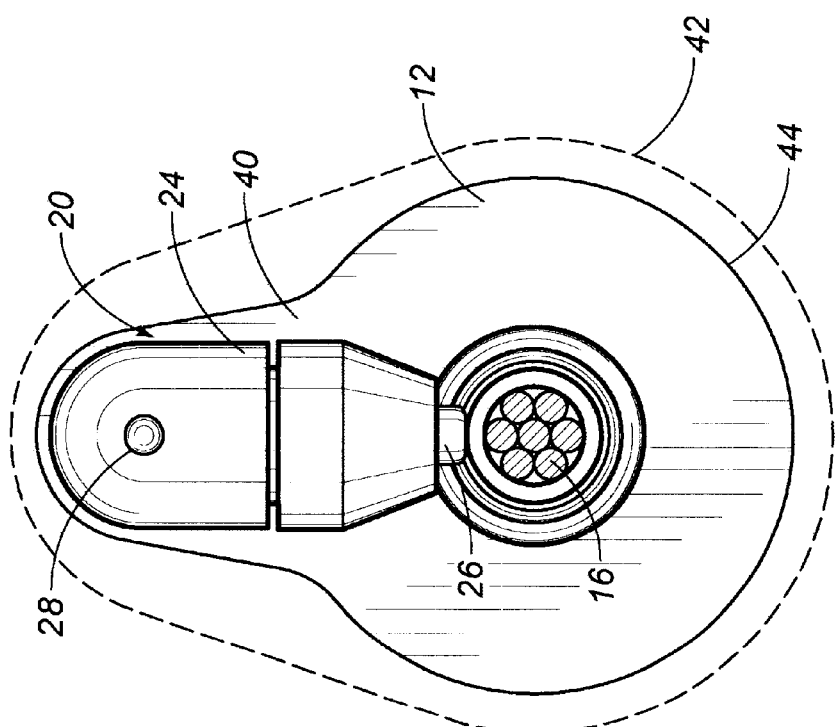
FIG. 4 is an end view showing the size of the pocket used in the present invention in comparison with the size of the prior art pockets.

In FIG. 4, it can be seen that the cutting head 24 of the cutting torch 20 resides within a space 40 formed within the pocket 12. The cutting nozzle 26 is directed downwardly toward the exterior surface of the tendon 16 within the pocket 12. In FIG. 4, the pivot 28 is formed centrally of the upper portion of the cutting head 24 so as to be in longitudinal alignment with the handle 22.

Figure 5:
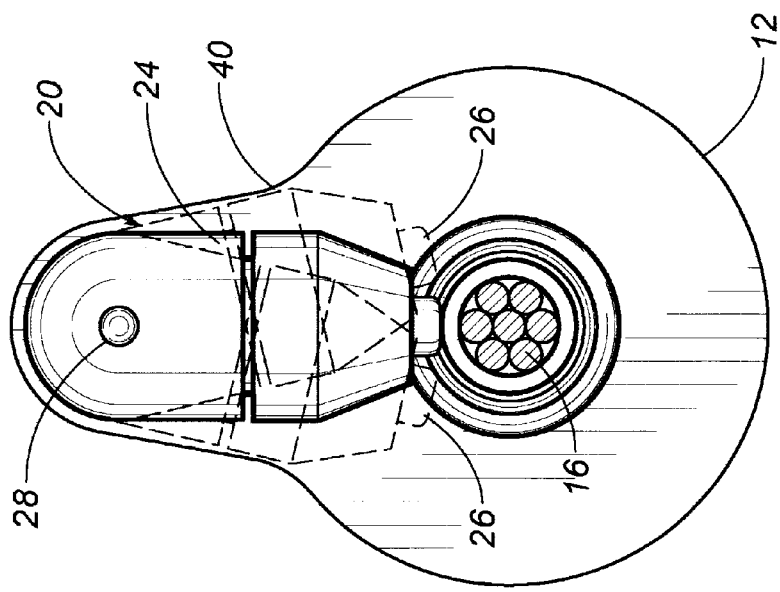
FIG. 5 is an end view showing the pivoting of the cutting torch within the pocket.

In FIG. 5, a broken line configuration 42 is particularly illustrated as surrounding the periphery 44 of the pocket 12. The broken line portion 42 is illustrative of the configuration of the pocket as used with prior U.S. Pat. Nos. 5,436,425 and 6,040,546. As was stated previously, these patents by the present inventor utilized shields so as to prevent damaging heat from affecting the structural integrity of the anchor 14 or the encapsulation surrounding the anchor 14. As can be seen in FIG. 4, the overall size of the pocket 12 is substantially reduced by the elimination of the shields. The space 40 provides a sufficient area in which the cutting head 24 can pivot within the pocket 12.

The pivoting of the cutting head 24 of the cutting torch 20 is particularly illustrated in FIG. 5. The cutting nozzle 26 can be directed across the diameter of the tendon 16. The space 40 within the pocket 12 allows the cutting head 24 to suitably pivot the cutting nozzle 26.

Figure 6:
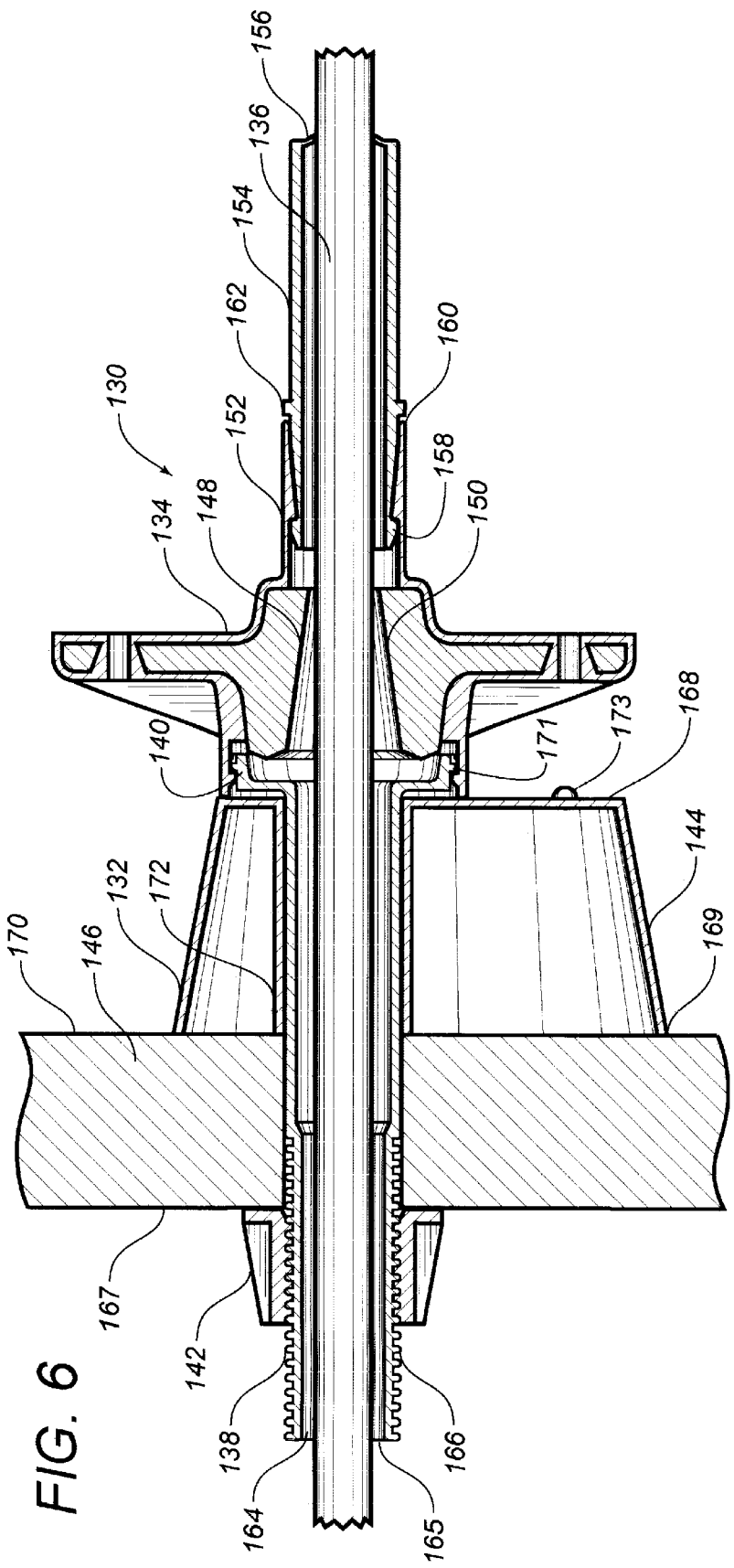
FIG. 6 is a cross-sectional side view showing the steps for the formation of the pocket in the concrete slab.

FIG. 6 shows the manner of forming the pocket of FIGS. 1–5. In FIG. 6, there is shown at 130 the post-tension system which utilizes a particular pocketformer apparatus 132 for the formation of the pocket of the present invention. The post-tension system 130 includes an anchor member 134 with a tendon 136 extending therethrough. A tubular member 138 has a flanged end 140 in snap-fit engagement with the anchor member 134. A securement member 142 is threadedly received around the exterior of the tubular member 138. A cup member 144 is placed around the exterior of the tubular member 138. The cup member 144 is interposed between the anchor member 134 and form board 146. The form board 146 is positioned between the securement member 142 and the cup member 144.

In the present invention, the anchor member 134 is an encapsulated anchor of a type commonly used in post-tension construction. The anchor member 134 includes an interior bore 148 of a tapered configuration. Wedges 150 are inserted into the tapered bore 148 so as to exert a friction fit contact with the exterior surface of the tendon 136. A tubular portion 152 of the anchor member 134 extends rearwardly of the tapered bore 148. A corrosion protection tube 154 is received within the tubular portion 152 by snap-fit engagement. A sealing area 156 is located at the end of the corrosion protection tube 154 so as to establish a liquid-resistant seal between the exterior of the tendon 136 and the interior of the corrosion protection tube 154. In simple terms, the forward end 158 of the corrosion protection tube 154 is inserted into the open end 160 of the tubular portion 152 until the end 158 is snap-fitted within the interior of the tubular portion 152 and the shoulder 162 is in proximity to the end 160 of the tubular portion 152. As such, the corrosion protection tube 154 will assure that liquid intrusion does not affect the integrity of the tendon 136 extending therethrough.

The pocketformer apparatus 132 of the present invention includes the tubular member 138, the securement member 142 and the cup member 144. The tubular member 138 has a tubular interior 164 through which the tendon 136 extends.

The tendon 136 will have an end which extends outwardly of the end 165 of the tubular member 138. External threads 166 will extend for a portion of the length of the tubular member 138. The securement member 142 is a nut-like member which includes threaded portions that are threadedly received between the external threads 166 of the tubular member 138. The securement member 142 is slidable or rotatable about the threads 166 so as to be moved into surface-to-surface contact with the face 167 of the form board 146.

The tubular member 138 includes a flanged end 140 which extends outwardly from an end of the tubular member 138. The flanged end 140 will have a receptacle 171 formed thereon. The cup member 44 has a generally double oval shape with a forward face 168 having the pivot forming surface 173 positioned thereon and spaced from the tendon 136. The cup member 144 will also have a rearward edge 169. The end of the anchor member 134 will be in surface-to-surface contact with the forward face 168 when the pocketformer apparatus is installed. The cup member 144 has a tubular section 172 extending through the interior of the cup member 144. The tubular member 138 will be slidably received within the tubular section 172. The tubular section 172 has one end opening at face 168 and another end opening at the back edge 169 of the cup member 144. The edge 169 will be open to the interior of the cup member 144 but be in coplanar relationship with the end of the tubular section 172.

In normal practice, the pocketformer apparatus 132 will be installed in the concrete structure prior to the pouring of the concrete. When the concrete has been poured and it is desired to remove the pocketformer apparatus 32, it is only necessary to remove the securement member 142 from the threads 166 on the tubular member 138. The form board 146 can then be removed.

After the form board 146 is removed, the exposed end 165 of the tubular member 138 is pushed inwardly in the direction toward the anchor member 134. The tubular member 138 is then rotated so as to free the receptacle mechanism on the flanged end 140 to be released from the tubular section 137 of the encapsulation of the anchor member 134. The cup member 144 and the tubular member 138 are removed by pulling the exposed end 165 of the tubular member 138 outwardly. The flanged end 140 is released from the anchor member 134. The tubular member 138 can slide outwardly so as to be removed from the end of the tendon 136.

Following the removal of the cup member 144, an indentation will be formed in the wall 13 of the remaining pocket by the relationship between the protrusion 173 and the formed wall 13. The indentation will then be suitable for the receipt of a complementary protrusion on the head of the cutting torch. It should be noted that, alternatively, the protrusion 173 can be in the form of an indentation so that a suitable protrusion is formed which extends outwardly of the wall 13 of the pocket 12.

The embodiment shown in FIG. 6 is related to that of U.S. Pat. No. 5,897,102 to the present inventor. However, it is important to note that various other forms of pocketformer arrangements can be used for the purposes of forming the pivot point in the wall 13 of the pocket 12. Common and typically used pocketformer apparatus, such as that shown in FIG. 1 of U.S. Pat. No. 5,897,102, can incorporate a suitable molding member, such as protrusion 173, for the purposes of forming this pivot point 15.

Figure 7:
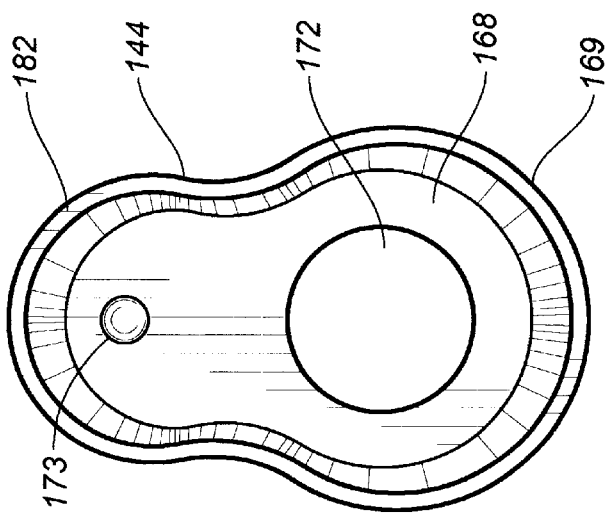
FIG. 7 is an end view of the pocketformer as used in the present invention.

FIG. 7 is a view of the face 168 of the cup member 144. Cup member 144 has a double oval shape. Face 168 is a generally flat face with a tubular opening 172 formed therein. It can be seen that the tubular opening 172 is offset from the center of the face 168. The side 182 of the cup member 144 extends angularly outwardly so as to terminate at back edge 169. The angled side of the cup member 144 facilitates the ability to mold the cup member 144 in an injection molding process. Furthermore, this angled side of the cup member 144 also facilitates the ability to slidably remove the cup member 144 from the concrete after the concrete has solidified. The protrusion 173 (or pivot point) is illustrated as positioned within the upper portion of the face 166 and spaced away from the opening 172.

Figure 8:
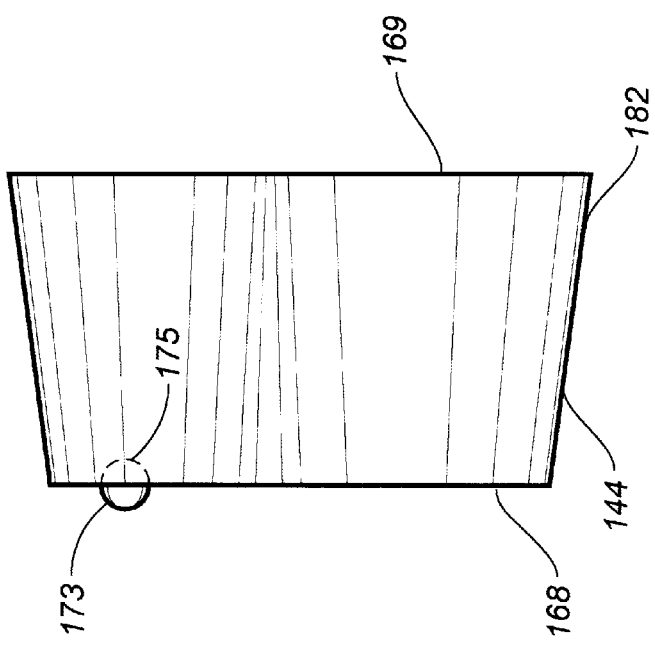
FIG. 8 is a size view showing the pocketformer as used in the present invention.

FIG. 8 shows a side view of the cup member 144. As can be seen, the sides 182 taper outwardly from the face 168 to the back edge 169. It can be seen that the back edge 169 is of a planar configuration so that the cup member 144 will evenly contact the face 170 of the form board 146. In FIG. 8, it can be seen that a protrusion 173 is formed on the face 168. Alternatively, as illustrated in broken-line fashion, an indentation 175 can be formed in the face 168 so as to form a corresponding protrusion in the wall 13 associated with the pocket 12.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A post-tension construction apparatus comprising:
   a concrete slab;
   an anchor embedded in said concrete slab;
   a tendon fixedly received by and extending through said anchor, said tendon having a portion extending outwardly of said anchor;
   a pocket formed in said concrete slab and extending outwardly from said one end of said anchor, said portion of said tendon extending through said pocket, said pocket having a wall extending outwardly from said end of said anchor, said wall having a pivot point formed thereon; and
   a cutting torch removably received with said pocket, said cutting torch having a pivot formed thereon, said pivot being pivotally engaged with said pivot point of said pocket.

2. The apparatus of claim 1, said cutting torch having a cutting nozzle positioned adjacent said tendon when said pivot engages said pivot point.

3. The apparatus of claim 2, said pocket having a space around said tendon suitable for allowing said cutting nozzle to pivot angularly therein such that said cutting nozzle directs cutting energy across a diameter of said tendon in said pocket.

4. The apparatus of claim 1, said pivot point being a protrusion extending into said pocket.

5. The apparatus of claim 1, said pivot point being an indentation extending inwardly of said concrete slab from said wall.

6. The apparatus of claim 1, said pivot of said cutting torch being either a protrusion or an indentation.

7. A method of cutting a tendon extending outwardly from an end of an anchor embedded in a concrete slab, the method comprising:

forming a pocket in the concrete slab adjacent the end of the anchor;

forming a pivot point in a wall of said pocket extending outwardly from the end of the anchor;

forming a pivot on a head of a cutting torch, said pivot having a size and shape mateable with said pivot point;

inserting said cutting torch into said pocket such that said pivot engages with said pivot point;

directing a cutting nozzle of said cutting torch toward the tendon; and pivoting said cutting torch within said pocket such that the tendon is severed by cutting energy from said cutting nozzle.

8. The method of claim 7, further comprising:

removing said cutting torch from said pocket when the tendon is severed.

9. The method of claim 7, said step of forming a pivot point comprising forming a protrusion extending outwardly from said wall into said pocket, said step of forming a pivot comprising forming an indentation in said head of said cutting torch.

10. The method of claim 7, said step of forming a pivot point comprising forming an indentation in said wall of the concrete slab, said step of forming a pivot comprising forming a protrusion on said head of said cutting torch so as to extend outwardly of said head away from said cutting nozzle.

11. The method of claim 7, said step of forming a pocket comprising:

securing the end of the anchor against one end of a pocketformer, said pocketformer being tapered so as to widen from the end of the anchor;

affixing an opposite end of said pocketformer against a form board;

solidifying concrete over and around said pocketformer and said anchor; and removing said pocketformer from the end of the anchor after the concrete solidifies.

12. The method of claim 11, said step of forming a pivot point comprising:

forming a pivot forming surface on said one end of said pocketformer spaced from the tendon; and separating said pivot forming surface from the concrete after the concrete solidifies.

13. The method of claim 12, said pivot forming surface being a protrusion extending outwardly from said one end of said pocketformer.

14. The method of claim 12, said pivot forming surface having an indentation formed in said one end of said pocketformer so as to extend away from said one end of said anchor.

* * * * *